(12) United States Patent
Joffray et al.

(10) Patent No.: US 9,245,020 B2
(45) Date of Patent: Jan. 26, 2016

(54) COLLABORATIVE MEDIA SHARING

(75) Inventors: Flynn Joffray, Vashon, WA (US);
Sameer Halai, Seattle, WA (US);
Stephen Coy, Redmond, WA (US);
Steve Ickman, Redmond, WA (US);
Todd Newman, Mercer Island, WA (US); Will Portnoy, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 693 days.

(21) Appl. No.: 13/325,873

(22) Filed: Dec. 14, 2011

(65) Prior Publication Data
US 2013/0159858 A1    Jun. 20, 2013

(51) Int. Cl.
| | | |
|---|---|---|
| *G06F 3/00* | (2006.01) | |
| *G06F 3/048* | (2013.01) | |
| *G06F 17/30* | (2006.01) | |
| *H04N 21/4788* | (2011.01) | |
| *H04N 21/482* | (2011.01) | |
| *H04N 21/6587* | (2011.01) | |
| *G06F 3/16* | (2006.01) | |
| *G06F 3/0481* | (2013.01) | |

(52) U.S. Cl.
CPC .... *G06F 17/30817* (2013.01); *G06F 17/30828* (2013.01); *H04N 21/4788* (2013.01); *H04N 21/482* (2013.01); *H04N 21/4825* (2013.01); *H04N 21/6587* (2013.01); *G06F 3/04817* (2013.01)

(58) Field of Classification Search
CPC ............................. G06F 17/30011; G06F 3/165
See application file for complete search history.

(56) References Cited

U.S. PATENT DOCUMENTS

| | | | | |
|---|---|---|---|---|
| 6,484,156 | B1 * | 11/2002 | Gupta et al. | 707/802 |
| 6,941,324 | B2 * | 9/2005 | Plastina et al. | |
| 7,111,009 | B1 * | 9/2006 | Gupta et al. | 369/30.08 |
| 7,234,117 | B2 | 6/2007 | Zaner et al. | |
| 7,386,798 | B1 * | 6/2008 | Heikes et al. | 715/752 |
| 7,409,639 | B2 * | 8/2008 | Dempski et al. | 715/705 |
| 7,426,537 | B2 * | 9/2008 | Lee et al. | 709/204 |
| 7,631,015 | B2 * | 12/2009 | Gupta et al. | |
| 7,685,132 | B2 * | 3/2010 | Hyman | 707/999.01 |

(Continued)

OTHER PUBLICATIONS

"Are Live Video Parties the Next Big Thing in Social Video?", Retrieved <<http://socialtimes.com/live-video-parties_b75649>>, Retrieved Date: Oct. 21, 2011, pp. 3.

(Continued)

*Primary Examiner* — Yongjia Pan
(74) *Attorney, Agent, or Firm* — Steve Wight; Sandy Swain; Micky Minhas

(57) ABSTRACT

A media party network service manages a set of media parties and a set of users of the media party service. Managing the media parties can involve instantiating new media parties according to input from the users, allowing the users to join the media parties, and tracking which users are participating in which media parties. Managing a given one of the media parties may include maintaining a queue of media items, allowing users in the media party to provide input to add media items to the queue and to provide input to skip media items in the queue. The media party service streams the given one of the media parties to client devices of the users currently in the given media party such that all of the client devices are currently displaying substantially a same part of a media item in the corresponding queue.

19 Claims, 10 Drawing Sheets

(56) References Cited

U.S. PATENT DOCUMENTS

| | | | |
|---|---|---|---|
| 7,716,376 B1* | 5/2010 | Price et al. | 709/248 |
| 7,840,292 B2* | 11/2010 | Buil et al. | 700/94 |
| 8,200,681 B2* | 6/2012 | Hedge et al. | 707/758 |
| 8,327,266 B2* | 12/2012 | Svendsen | 715/716 |
| 8,555,177 B1* | 10/2013 | Junee et al. | 715/751 |
| 8,655,953 B2* | 2/2014 | Kandekar et al. | 709/205 |
| 8,732,193 B2* | 5/2014 | Skeen et al. | 707/769 |
| 8,812,580 B2* | 8/2014 | Hyman | 709/203 |
| 2002/0085030 A1* | 7/2002 | Ghani | 345/751 |
| 2003/0126211 A1* | 7/2003 | Anttila et al. | 709/205 |
| 2004/0254659 A1* | 12/2004 | Bolas et al. | 700/94 |
| 2006/0087987 A1* | 4/2006 | Witt et al. | 370/260 |
| 2006/0143236 A1* | 6/2006 | Wu | 707/104.1 |
| 2007/0169165 A1 | 7/2007 | Crull et al. | |
| 2007/0266304 A1* | 11/2007 | Fletcher et al. | 715/500.1 |
| 2008/0004734 A1* | 1/2008 | Li et al. | 700/94 |
| 2008/0028323 A1* | 1/2008 | Rosen et al. | 715/752 |
| 2008/0183811 A1* | 7/2008 | Kotras et al. | 709/203 |
| 2009/0019553 A1* | 1/2009 | Narayanaswami | 726/28 |
| 2009/0044216 A1* | 2/2009 | McNicoll | 725/5 |
| 2009/0063991 A1* | 3/2009 | Baron et al. | 715/751 |
| 2009/0100062 A1* | 4/2009 | Fisher et al. | 707/10 |
| 2009/0182891 A1* | 7/2009 | Jalili et al. | 709/231 |
| 2009/0228919 A1* | 9/2009 | Zott et al. | 725/34 |
| 2009/0249222 A1* | 10/2009 | Schmidt et al. | 715/751 |
| 2009/0276709 A1* | 11/2009 | Venneman et al. | 715/716 |
| 2009/0327282 A1* | 12/2009 | Wittig et al. | 707/5 |
| 2009/0328122 A1* | 12/2009 | Amento et al. | 725/114 |
| 2010/0070878 A1* | 3/2010 | Amento et al. | 715/751 |
| 2010/0083324 A1* | 4/2010 | Smith et al. | 725/109 |
| 2010/0228740 A1* | 9/2010 | Cannistraro et al. | 707/748 |
| 2011/0218656 A1* | 9/2011 | Bishop et al. | 700/94 |
| 2011/0258545 A1* | 10/2011 | Hunter | 715/716 |
| 2011/0314388 A1* | 12/2011 | Wheatley | 715/751 |
| 2012/0036423 A1* | 2/2012 | Haynes et al. | 715/230 |
| 2013/0254663 A1* | 9/2013 | Bates et al. | 715/716 |
| 2014/0033073 A1* | 1/2014 | Pegg | 715/753 |

OTHER PUBLICATIONS

"Box's Soup", Retrieved at <<http://box.soup.io/tag/contributor>>, Retrieved Date: Oct. 21, 2011, pp. 214.

"What is muvee Cloud all about?", Retrieved at <<http://cloud.muvee.com/learnmore>>, Retrieved Date: Oct. 21, 2011, p. 1.

Stravarius, Justin, "7 Fun Facebook Video Conferencing and Chat Apps", Retrieved at <<http://web.appstorm.net/roundups/communication-roundups/7-fun-facebook-video-conferencing-and-chat-apps/>>, Sep. 5, 2010, pp. 15.

Lancet, Yaara, "Tired of Watching Videos Alone? Here Are the Best 3 Ways to Watch YouTube with Friends", Retrieved at <<http://www.makeuseof.com/tag/tired-watching-videos-3-ways-watch-youtube-friends/>>, Jul. 4, 2011, pp. 6.

"Identifying and Recommending Experts Using Shared Queries and Interactions", U.S. Appl. No. 13/152,319, filed Jun. 3, 2011, pp. 48.

* cited by examiner

COLLABORATIVE MEDIA SHARING

BACKGROUND

The proliferation of media sharing services on the Internet demonstrates the appeal of sharing media, in particular video media. A common approach is to allow users to post videos to a sharing service and then allowing other users to play the posted videos. With this approach, videos are viewed asynchronously. That is, users view videos at a time of their choosing, and with full control of the viewing experience. Although two users may have an interest in a same video, their viewing experiences are generally independent. Another common approach is to allow one controlling user, for example a VJ or DJ, to control a video feed, and a virtual audience of users may concurrently experience the same stream of media produced by the controlling user.

These approaches, and others, have failed to produce a collaborative media sharing experience where users with a common interest can collaboratively shape and control the same media that the users are or will be concurrently experiencing. Techniques related to collaborative media sharing are discussed below.

SUMMARY

The following summary is included only to introduce some concepts discussed in the Detailed Description below. This summary is not comprehensive and is not intended to delineate the scope of the claimed subject matter, which is set forth by the claims presented at the end.

A media party network service manages a set of media parties and a set of users of the media party service. Managing the media parties can involve instantiating new media parties according to input from the users, allowing the users to join the media parties, and tracking which users are participating in which media parties. Managing a given one of the media parties may include maintaining a queue of media items, allowing users in the media party to provide input to add media items to the queue and to provide input to skip media items in the queue. The media party service streams the given one of the media parties to client devices of the users currently in the given media party such that all of the client devices are currently displaying substantially a same part of a media item in the corresponding queue.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

DETAILED DESCRIPTION

Embodiments discussed below relate to collaborative media sharing. Discussion will begin with an overview of collaborative media parties, followed by a description of a technical operating environment. User interface features, and collaborative operations will then be described in detail.

Figure 1:
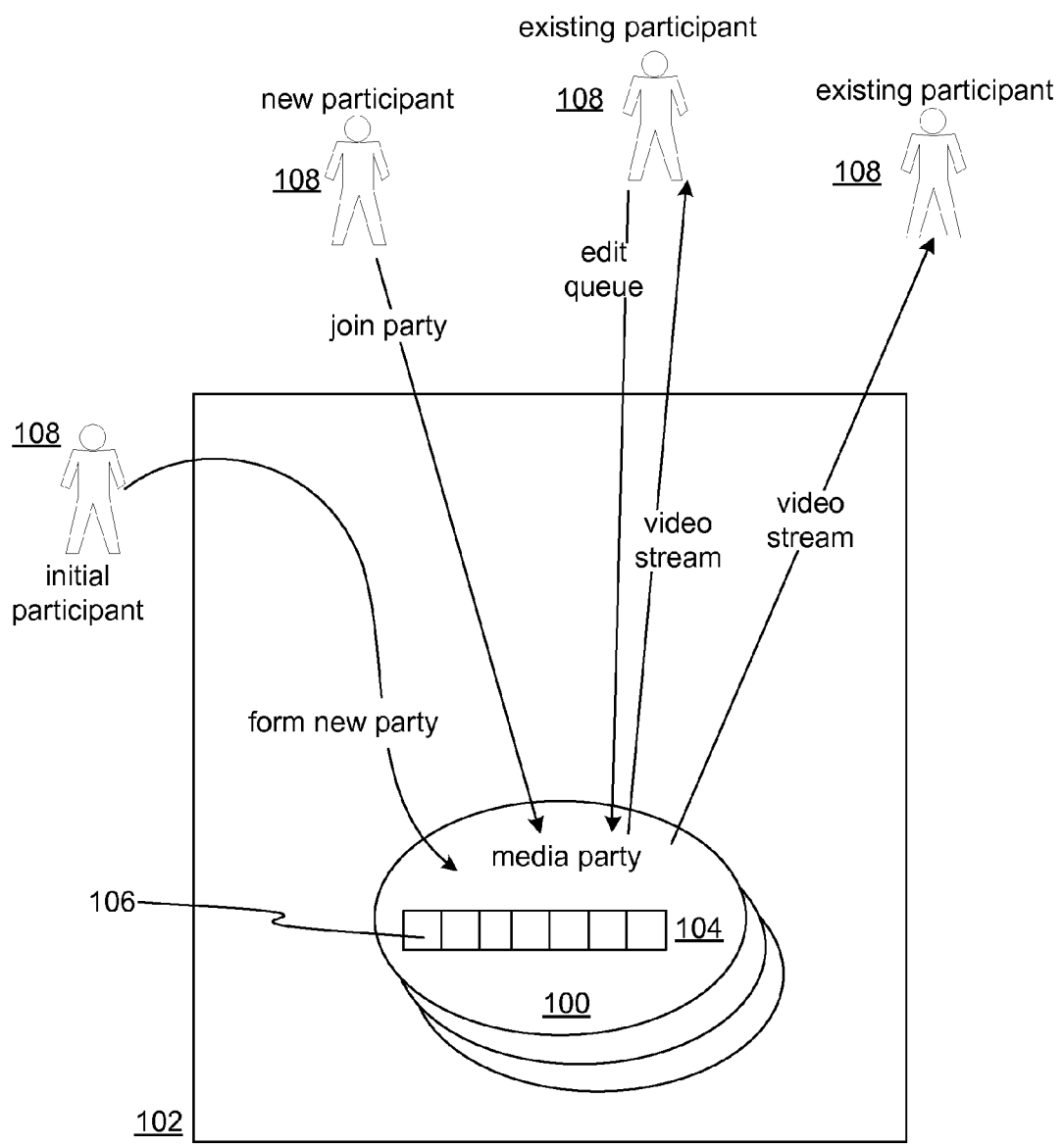
FIG. 1 shows an overview of a collaborative media party.

FIG. 1 shows an overview of a collaborative media party 100. A network service 102 maintains and manages media parties, including media party 100. Each media party has a media queue 104 comprised of individual media items 106. Each media party also has members or participants 108. The network service 100 can be implemented in a variety of ways, for example, as a network application hosted in a cloud, a multitier network service (see FIG. 2), a part of a search engine, as a component of a social networking website, etc. The participants 108 use respective client devices (e.g., mobile phones, laptops, workstations) that communicate with the network service 102 via a network. According to user inputs from the client devices, the network service 102 forms new media parties, adds and removes participants to and from parties, maintains and updates the media queues of the respective media parties, streams the media in the queues to the participants of the corresponding media parties, etc. As used herein, "media" will refer to at least video and audio, whether rendered from a video or audio data (e.g., clips and songs) or whether computer-generated (e.g., 3D animation).

Figure 2:
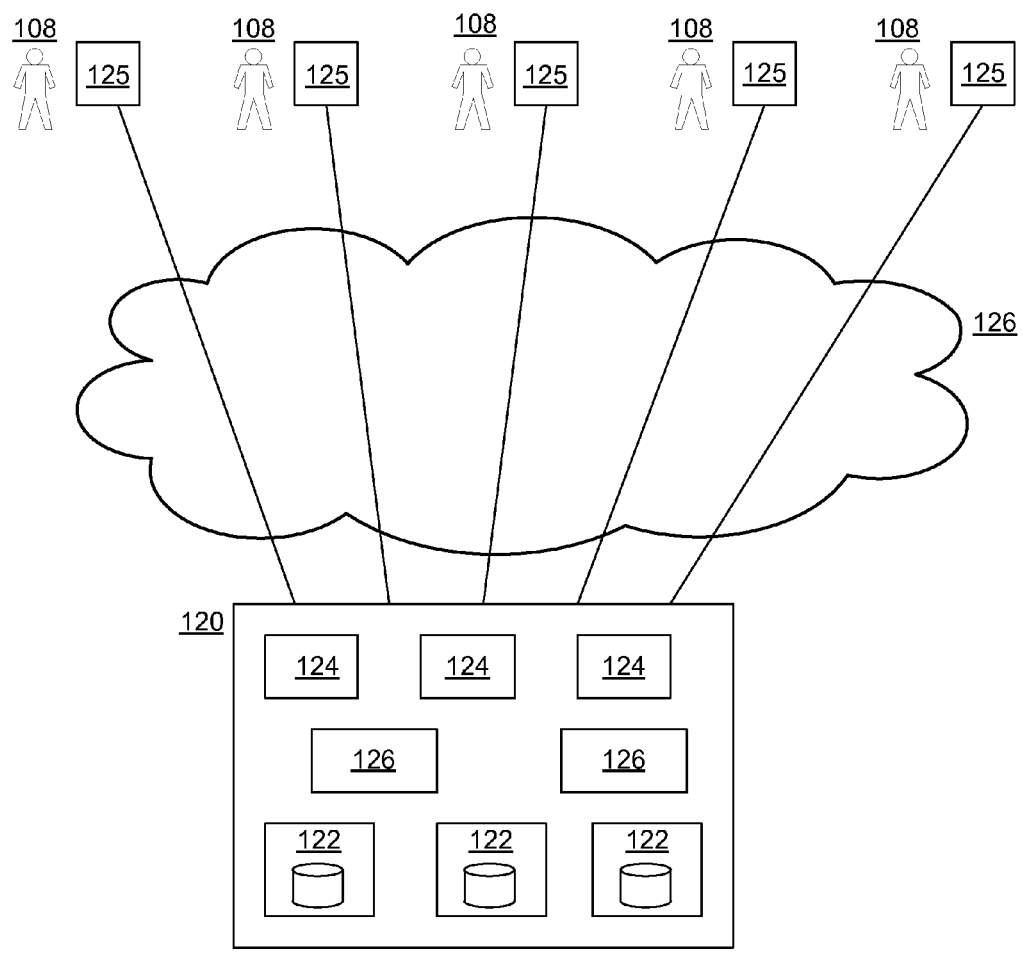
FIG. 2 shows a three-tier system having a data tier, a logic or control tier, and a presentation tier.

FIG. 2 shows a three-tier system 120 having a data tier, a logic or control tier, and a presentation tier. The three-tier system 120 is an example implementation of network service 102. The data tier may include one or more database servers 122, object stores, or the like. The data tier stores instances of media parties and data for each media party instance, such as metadata and state information (e.g., who is currently viewing the party, the current media and point therein that is being streamed/played), who is subscribed, who started the party, the party's queue content, historical data (past events of a party), media items in the queue, collaborative input related to the queue (e.g., vote counts for media items in the queue etc.) The presentation tier may be comprised of web servers 124. The client devices 125 connect access the system 120 by connecting to the web servers 124 through a network 126. The presentation tier may send program code, markup pages, scripting code, etc. to the client devices 125, to be displayed as respective user interfaces (see FIG. 4) for participating in media parties. Such user interfaces may allow users to form new parties, join parties, play the media content coming from a media party, alter the content of a media party, etc. Control tier 126 is comprised of servers 126 that host programs that implement logic of the media party system, model the media parties as objects, intermediate exchanges between the presentation tier and the data tier, and possibly perform other functions such as load balancing, fail-over switching, etc.

Figure 3:
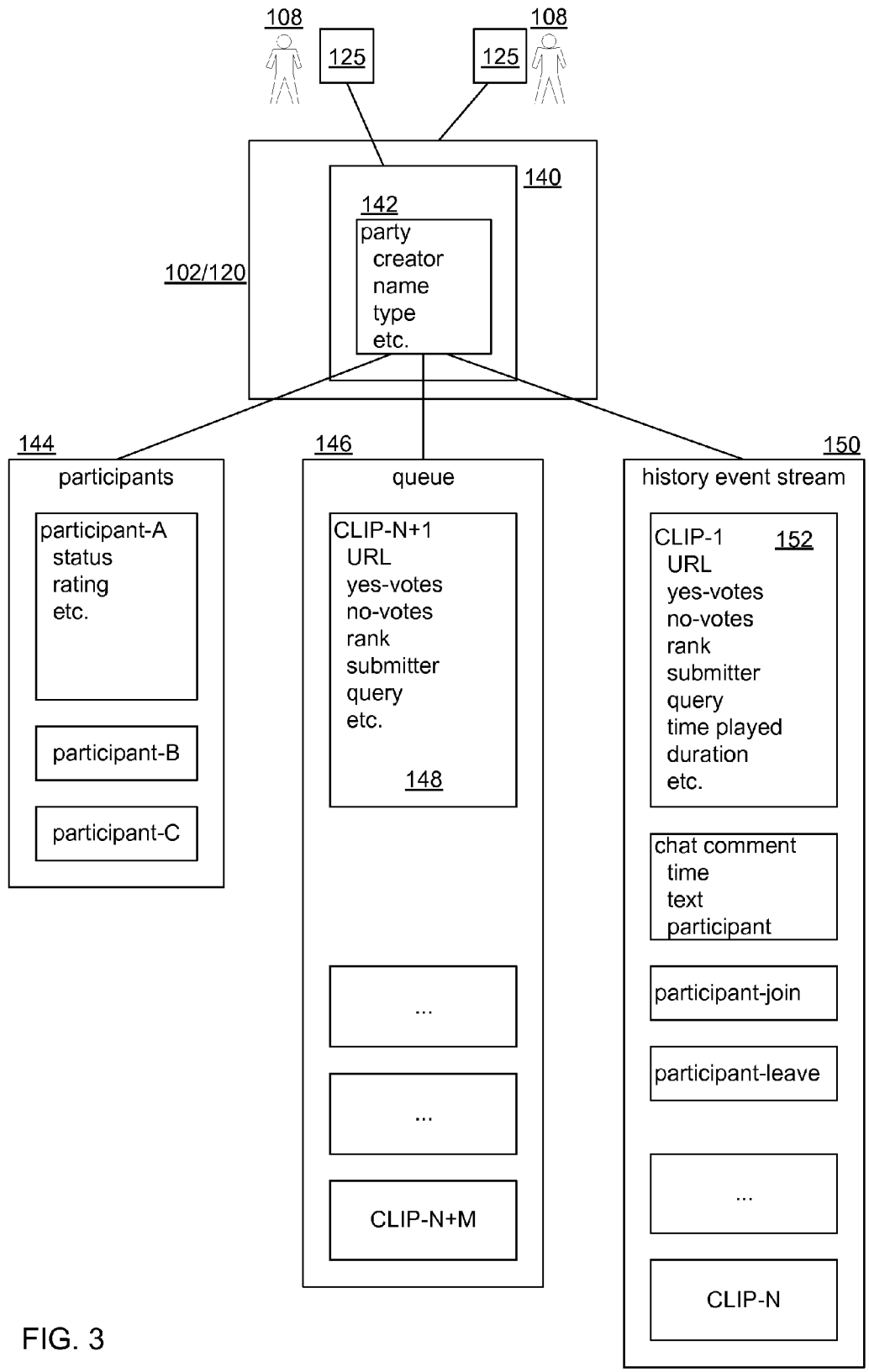
FIG. 3 shows an example of data stored for an example media party.

FIG. 3 shows an example of data stored for an example media party 140. The example of FIG. 3 is for illustration; the collaborative media sharing functionality described herein can be implemented with widely varying data structure and content. The media party 140 may have base metadata 142 storing properties of the media party such as the name of the party (e.g., "exploding batteries"), the identity of the user who created the media party 140, a type or category (e.g., open to public, invitation only), topical keywords, an associated search string or topic, and so on. The data of the media party 140 may also include participant data 144, indicating information such as who is a member of the media party 140, what is each member's or participant's status (currently listening/viewing, off-line), and other information.

The media party 140 data may also include queue data 146. The queue data 146 may have entries 148 representing media items queued for playing to current participants. Each entry 148 may have information about a media item, including a location or uniform resource locator of the media item, counts of votes for and against the media item, the identity of a user who submitted the media item to the media party 140, a query string or keywords associated with the media item, a rank or priority of the media items in the queue, and media data such as a title, duration, etc.

The media party 140 may also have history data 150. In one form, the history data 150 is a log or journal of timestamped events 152 associated with the media party 140. Such events 152 may indicate which media items were previously played by the media party 140 and when they were played, chat comments of participants listening to or viewing the media party 140, participants joining and leaving the media party 140, which participants voted for or against which media items (e.g., "Joe voted to skip the 'smoldering battery' clip"), and queue events such as media items being added, removed, reordered, completing or starting, and so on. These are illustrative examples that are neither required nor exhaustive.

Figure 4:
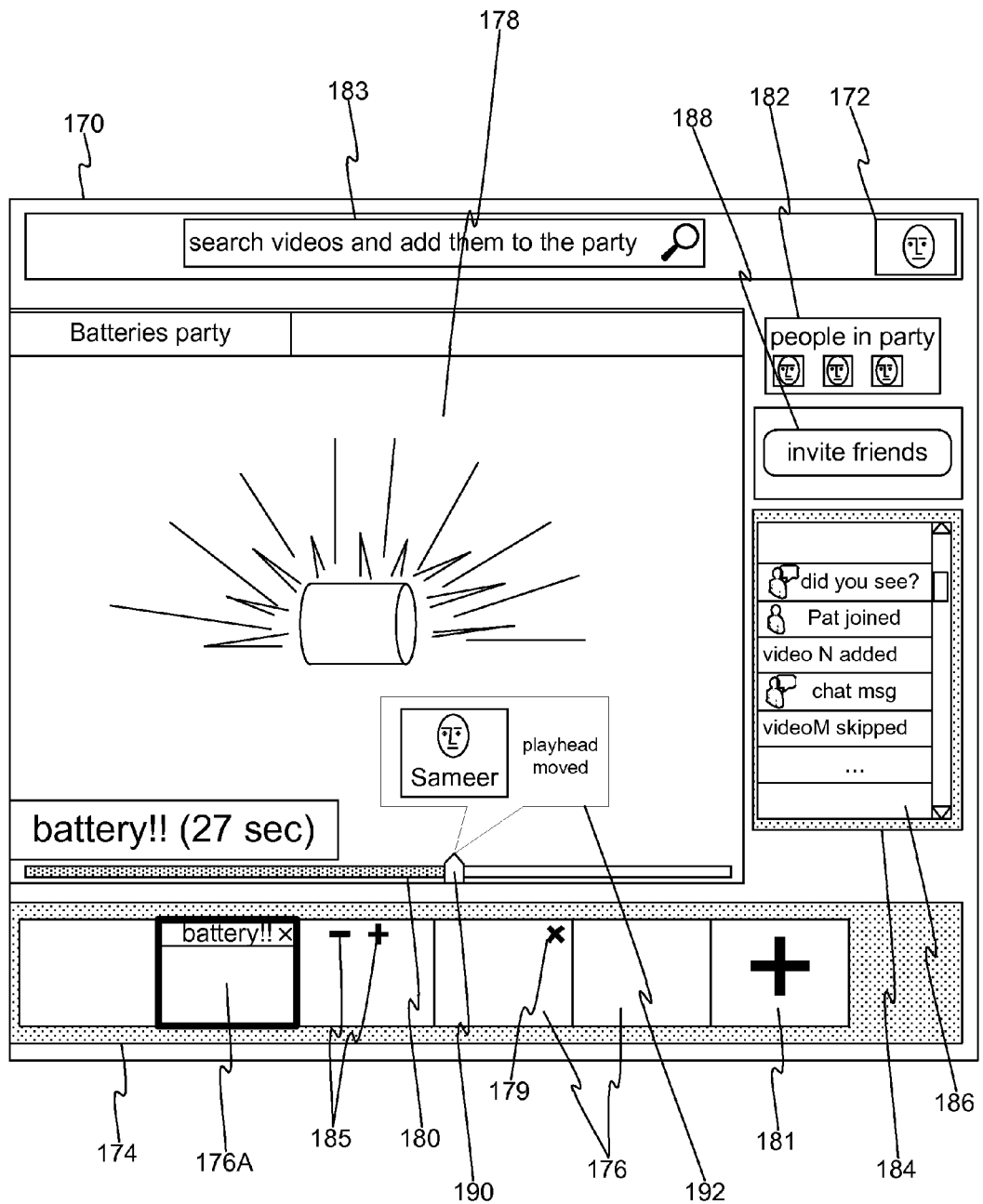
FIG. 4 shows a user interface displayed on a client device.

FIG. 4 shows a user interface 170 displayed on a client device 125. The user interface 170 may be displayed as a browser window or a standalone application displaying server data. The user interface 170 is for participating in a particular media party. In the example of FIG. 4, the media party is titled "Batteries party". The participant using the user interface 170 is depicted by icon 172. The user interface 170 also displays a graphic queue 174 representing the current media party's queue of media items. The graphic queue 174 displays media icons 176, including a current media icon 176A representing a media item currently being played to the participants of the media party.

A media display area 178 displays the media currently being played for the media party. The media display area 178 may include a progress indicator 180 indicating progress of the current media item. As discussed further below, each current participant in the media party has an instance of the user interface 170, with nearly the same appearance as user interface 170. In other words, each participant sees the current media queue and the current media being played for the media party.

The user interface 170 may include other elements such as a participant display area 182 displaying thumbnails or avatars of users currently in the media party. The user interface 170 may also include an information display area 184 to display information about events related to the media party as they occur. For example, the information display area 184 may display event indicators 186 to indicate: when users join or leave the media party, chat messages from participants, changes to the media queue, both for and against media items, and other information related to the media party. Events represented in the information display area 184 may be captured in a corresponding log such as history data log 150.

To facilitate collaborative media sharing, the user interface 170 and the party-implementing system in communication therewith enable collaborative participant control over the media being queued and played for a media party. With respect to the user interface 170, parts of the graphic queue 174 may be interactive. A media icon 176 may be provided with user interface elements such as vote buttons 185 to vote for or against a corresponding media item, or a button 179 to allow the user to remove the corresponding media item from the queue. In one embodiment, the graphic queue 174 may have an add button 181, that, when invoked, allows the user to specify a new media item to add to the media queue, possibly by putting input focus on a search element 183.

The search element 183 may be included to allow the user to input queries to search for media to add to the video party. When a search is entered, media items matching the search are displayed and the user can select a media item to add to the media queue. Finally, to further enhance collaboration, an invitation button 188 can be activated to invite other users to the current media party.

With regard to the collaborative control of the media, it should be noted that control of the content and ordering of the media queued for a media party can be open to more than one user. In one embodiment, any user is allowed to join any media party, and each member of a party has some control over the media party. Several techniques for facilitating control can be used. As mentioned above, votes can be collected from participants in a media party, and actions on the queue of the media party are taken according to the votes. Voting is described in detail with reference to FIG. 5. In one embodiment, any member of a media party can edit the party's media queue, for example, by skipping or deleting a media item, adding a media item, changing the order of items in the queue, etc. In this case, each time a participant changes the queue, other participants who are in the party see their graphic queues update accordingly. While unrestricted rights of participants can produce a rapidly changing and perhaps unique experience, voting can be helpful to prevent "rickrolling" and other disruptive actions.

Further regarding collaborative control of the media, one embodiment includes a scrubbing control 190. The scrubbing control 190 can be displayed on various of the instances of user interface 170. The scrubbing control 190 can indicate progression of the current media being played. In various embodiments, the scrubbing control 190 can also control the network service 120's playback of the current media item; any scrubbing by one participant is synchronized to the other participants so that each sees the scrub operation and the playback stays synchronized. In an embodiment where all participants have full control over media playback, any participant can manipulate their respective scrubbing control 190 to change the playback point of the current media item. Optionally, the user interface 170 of other users may display a graphic 192 indicating the user who is currently scrubbing the media item. In the example of FIG. 4, a remote user "Sameer" has moved his scrubbing control 190 to change the playback point. The graphic 192 can also provide information about the recent operation, such as "playhead moved", "restarted at 1:31", "skipped 4:20 forward", etc. In another embodiment, only privileged users or users who added the currently playing media item are permitted to scrub.

Figure 5:
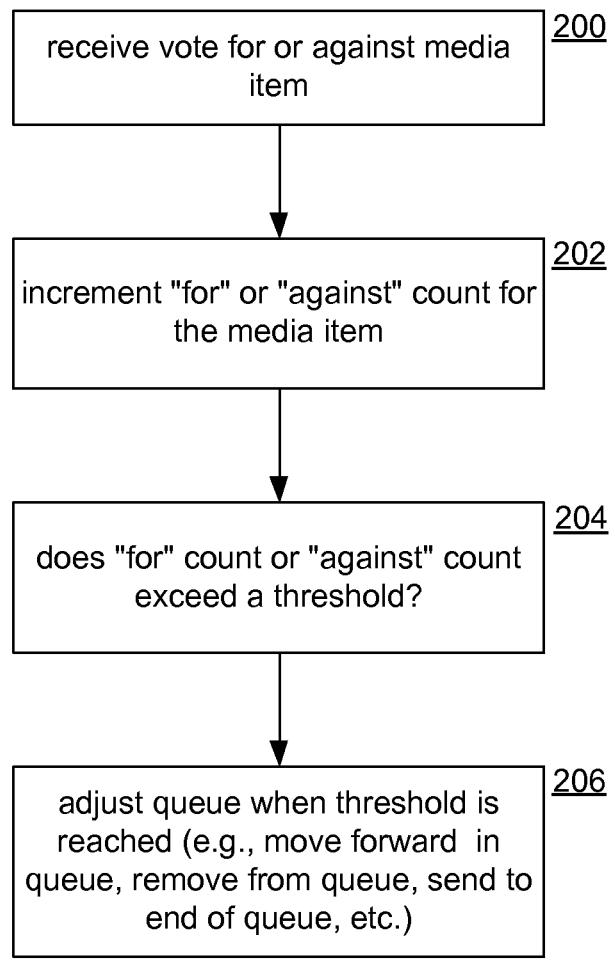
FIG. 5 shows a process for collaborative control by voting.

FIG. 5 shows a process for collaborative control by voting. At step 200, for a particular media party being managed, system 120 receives a vote for or against a media item. The vote might be for skipping or removing a media item, moving a media item to the front of the corresponding media queue, adding a new item, etc. At step 202, the incoming vote is added to a corresponding "for" or "against" count. At step 204, the updated voted count is compared against a threshold. At step 206, if the threshold is reached, then the queue is updated accordingly. By this means, participants can control the media party by voting. In one embodiment, media items can be queued and voted on while pending; when they are about to enter the head of the queue they are skipped or bumped to the back of the queue if they have not received sufficient votes.

Figure 6:
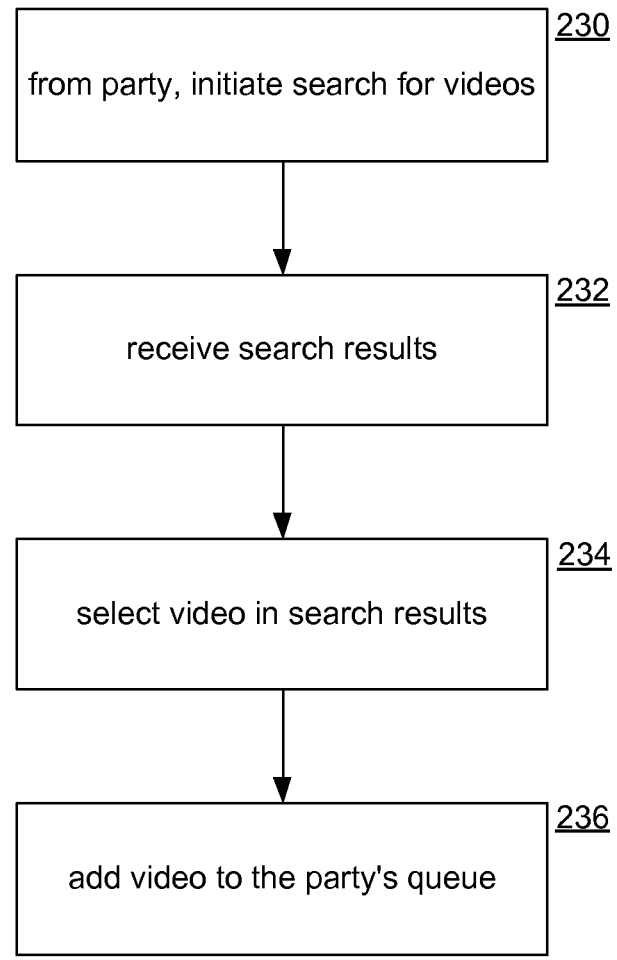
FIG. 6 shows a process for using a search to add media such as videos to a media party.

FIG. 6 shows a process for using a search to add media such as videos to a media party. At step 230, a participant in a given media party displayed in an instance of user interface 170 may initiate a new search for videos, for example, by inputting a query in search element 183. A search service handles the query and passes results (a list of matching videos) to the corresponding client, which receives the results at step 232. The results are displayed at step 234, and the user then selects a video which is added to the current party's queue at step 236. Open control of content and playing of the queue and can be turned on by setting vote thresholds to a value of one.

In one embodiment, the video party system is a web application that is an integral party of an open social search engine of the type described in U.S. patent application Ser. No. 13/105,914, filed May 12, 2011, and titled "SHARING PUBLIC SEARCH QUERIES AND INTERACTIONS". In this embodiment, not only is media searching readily available, but invitations can be obtained as part of the process of receiving a social stream in which the media party appears. For example, a social stream can be subscribed to by a user according to the social stream's relation to a particular topic or a particular user. A new media party can be advertised in such a stream. In addition, when a media item is added to a media party from search results supplied by an open social search engine, party-related interactions with that media item (e.g., addition to the party, votes, advancing or skipping, number of chat comments, etc.) can be used as search engine feedback. For instance, when a video is added to a media party of a particular topic, the video can be labeled as related to that topic and then used to help train statistical models or machine learning algorithms of the search engine. Generally, actions that indicate relevance of the video or media, such as "for" votes, increases in current participants when the video is played, etc., can indicate relevance. Other actions can indicate irrelevance, such as skipping a video or a drop-off in participation when the video is being played.

Figure 7:
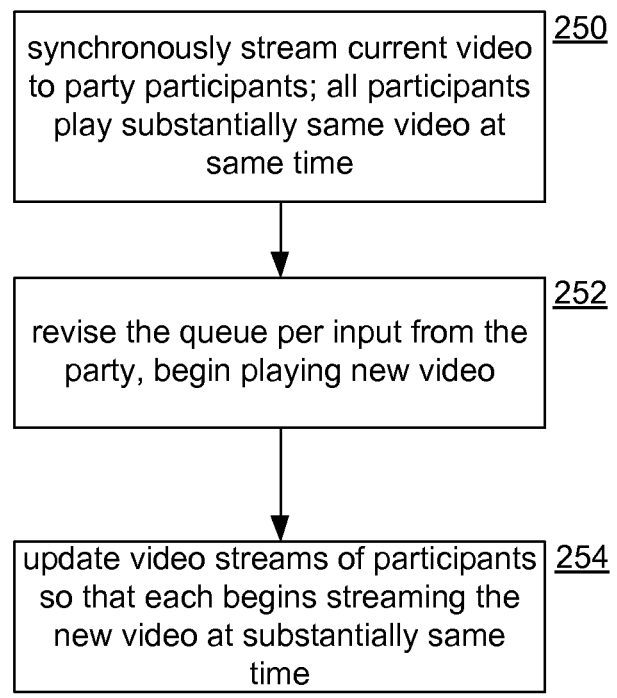
FIG. 7 shows a process for synchronizing video streams played to participants of a media party.

FIG. 7 shows a process for synchronizing video streams played to participants of a media party. At step 250 the media party system streams the current media item (a video) in the party's media queue to the participants of a media party. More specifically, each participant has a feed or stream, and the media party system synchronizes the streams or feeds of the participants such that each participant is playing substantially the same part of the same video at substantially the same time; "substantially" meaning that there is tolerance for some time separation, for example 5 or 10 seconds. At step 252, the queue is revised or updated according to input from the party participants, causing a new video or other type of media item to begin playing. At step 254 the video streams of the participants are updated such that each begins streaming the new video at substantially the same time. It will be appreciated that precise synchronization is not required; network latencies and other factors can skew the synchronization. Moreover, users can participate in a shared video watching experience with some tolerance for network latency and variation, and users can participate contemporaneously even while not being precisely synced. To ensure a continuity of the experience when stuttering occurs, the video bitrate can be lowered before lowering the audio bitrate to prevent discordant breaks in the sound. Generally, such technical adaptations can use heuristics or rules that reflect social conventions.

In addition to live participation, a video party can be experienced asynchronously. This can be enabled by tracking the history of video or media items played as well as comments, user-joins, and other events discussed above with reference to FIG. 3. In this way, when a user joins a video party, the user can experience past points of interest in the video party, in effect playing back the video party. Because comments are synced to the media timeline, replays of the media party allow the user to perceive the context in which replayed comments were made by other users. In addition, comments can comprise graphics that highlight or annotate particular regions of a video. A user playing back the history of a media party can join the live in-progress party at any point by activating a corresponding user interface element.

In one embodiment, a participant who is playing back the history of the media party is accelerated to catch-up to the present real-time media party. This can be accomplished with a number of known techniques for increasing the play speed of media in unobtrusive ways. For example, frames or chunks can be dropped during periods of somewhat constant video data, or play speed can be increased a small fraction above normal play speed. In yet another approach, a user settable play speed (e.g., "2×") can be set to catch up to the current play point of the video party. Subtle changes in playback speed or rate can be automatically adjusted by the media party application to help keep live participants continuously synchronized (e.g., within three seconds of each other). If one participant falls behind due to connectivity or performance problems, the participant's feed can be transparently accelerated to keep the participant synchronized.

Figure 8:
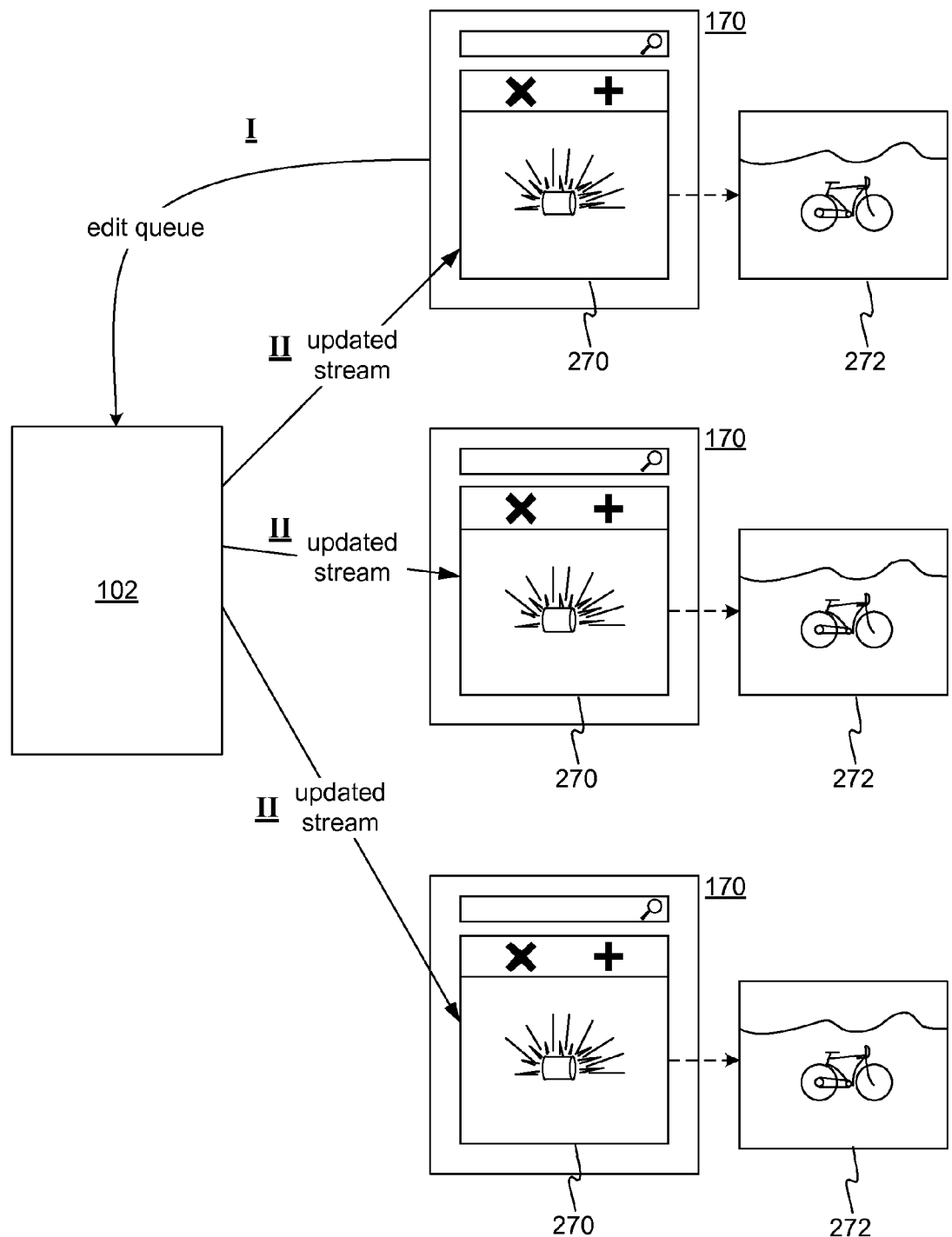
FIG. 8 illustrates how queue or streaming updates propagate to media party participants.
Figure 9:
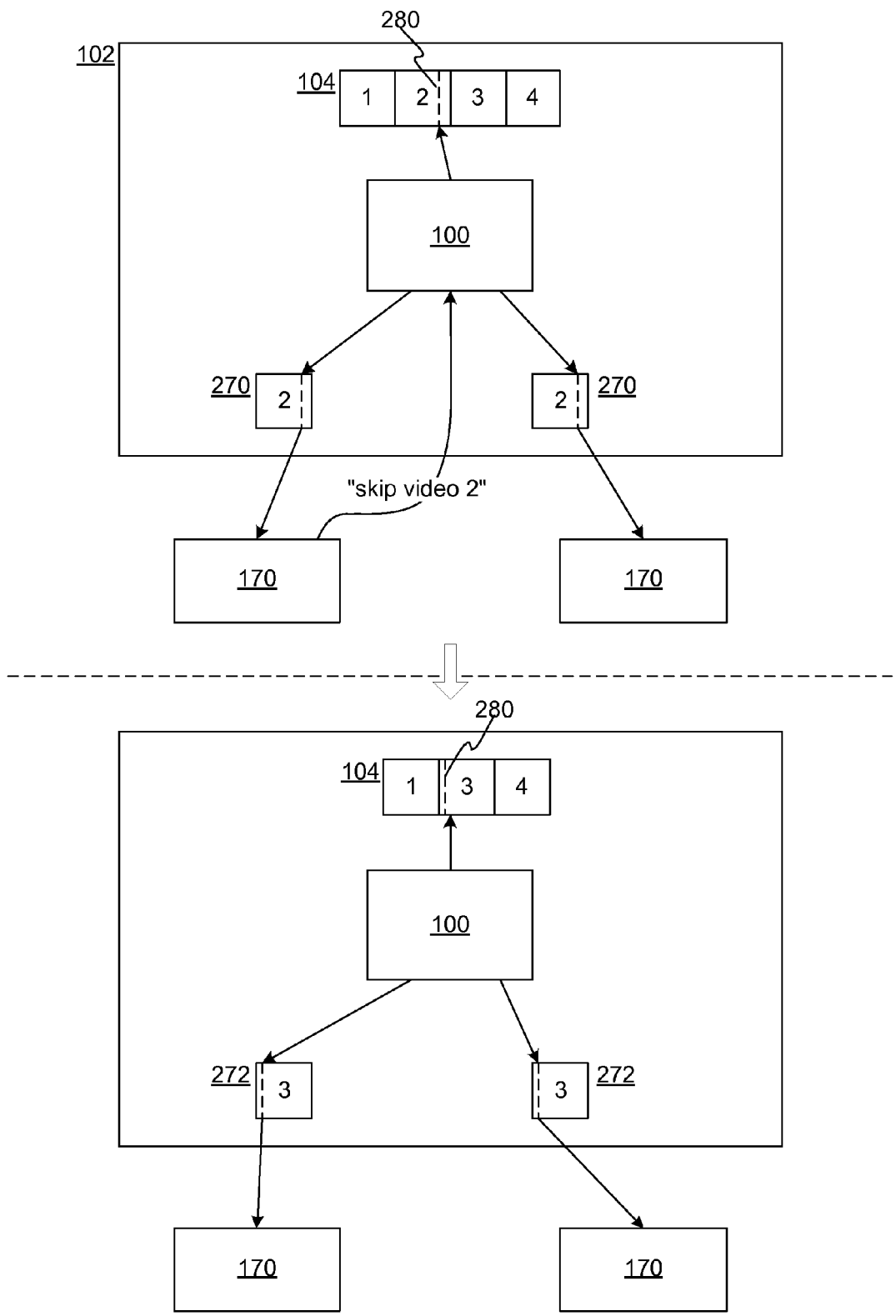
FIG. 9 shows media queue updates corresponding to FIG. 8.

FIG. 8 illustrates how queue or streaming updates propagate to media party participants. Initially, at timepoint I, each user interface 170 is displaying nearly the same portion of a video clip (an exploding battery is seen by each corresponding participant). At timepoint I, the media queue is edited (e.g., the current video is skipped) according to some individual or collective input. In response, a new video or new point of the same video is set as the current play-point for the media party. In turn, the media party system begins streaming the new current play-point to the respective client devices, which begin playing the same second video 272 of a bicycle on the respective user interfaces 170. Thus, in response to collaborative control, the video played for the participants synchronously updates from a first video 270 to a second video 272. FIG. 9 shows media queue updates corresponding to FIG. 8. Initially, in the upper half of FIG. 9, the media party network service 102 or web application is playing first video 270 at current point 280, which is streamed and synchronously displayed at the connected user interfaces 170. When the first video 270 is voted out of the media queue 104 (or removed by the person who added it), the media queue 104 is updated and, as shown in the lower half of FIG. 9, the second video 272 begins playing.

Figure 10:
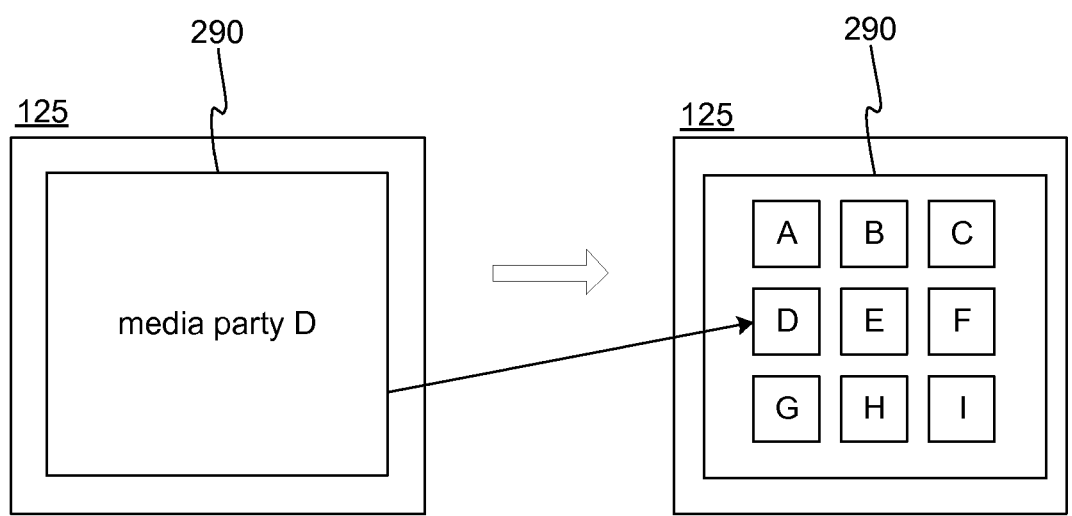
FIG. 10 shows a second user interface that can be provided to allow a user to participate in multiple media parties.

FIG. 10 shows a second user interface 290 that can be provided to allow a user to participate in multiple media parties. In this embodiment, a media party is a "sticky experience", in that leaving the main screen or user interface 170 of a given media party does not prevent the user from participating in the content viewing experience with the group of people on the main screen of the video party. In the example of FIG. 10, the second user interface shows reduced views of the various media parties that the corresponding user is subscribed to or participating in. The reduced views might show the current content and indicia of select events.

Embodiments and features discussed above can be realized in the form of information stored in volatile or non-volatile computer or device readable media. This is deemed to include at least media such as optical storage (e.g., compact-disk read-only memory (CD-ROM)), magnetic media, flash read-only memory (ROM), or any current or future means of storing digital information. The stored information can be in the form of machine executable instructions (e.g., compiled executable binary code), source code, bytecode, or any other information that can be used to enable or configure computing devices to perform the various embodiments discussed above. This is also deemed to include at least volatile memory such as random-access memory (RAM) and/or virtual memory storing information such as central processing unit (CPU) instructions during execution of a program carrying out an embodiment, as well as non-volatile media storing information that allows a program or executable to be loaded and executed. The embodiments and features can be performed on any type of computing device, including portable devices, workstations, servers, mobile wireless devices, and so on.

The invention claimed is:

1. A method performed by one or more computers to implement a network service, the method of the network service comprising:
storing and maintaining a set of media parties, each media party comprising a respective queue of media items and a respective group of participants able to participate with instances of a user interface provided at least in part by the network service;
for each of the media parties, storing a respective history of media items played, each media party having a respective history of media items played therefor, each history of media items continuing to be stored after the corresponding media items indicated therein have been played from the corresponding queues; and
wherein each user interface comprises a search element, wherein when a user inputs a search in the search element of a first user interface corresponding to the given media party, a new media item is selected from a corresponding media search result provided by a social search engine, and the new media item is added to the media queue of the given media party, the social search engine allowing social sharing of searches among users of the social search engine, wherein the social search engine shares the search inputted by the user with other users of the social search engine.

2. A method according to claim 1, wherein when the new media item is added a corresponding icon is displayed on the user interfaces that are displaying the given media party.

3. A method according to claim 1, wherein the network service simultaneously plays a current media item in the media queue to the client devices of the participants in the given media party, and any of the client devices can scrub the current media item such that a current play point of the current media item changes for all of the client devices.

4. A method according to claim 3, wherein the client devices display substantially a same part of the current media item at a substantially same time.

5. A method according to claim 4, wherein when determined that a sufficient number of participants in the given media party have submitted queue-edit votes directed to a media item in the queue of the given media party, performing a corresponding queue-edit for the queue and the media item.

6. A computing device displaying a user interface on a display of the computing device, the user interface operated by a participant in a video party, the user interface on the display comprising:
a graphic queue, displayed on the display, comprised of icons of video clips in a media queue of the video party, the graphic queue including an icon of a current video clip and icons of other respective video clips queued to be displayed in a main video display area of the display, wherein the user interface is configured to be interacted with by the user to input annotations to the main video display area to annotate the current video clip being displayed in the main video display area, wherein the input of the annotations causes the annotations to be displayed in displays of the current video clip at client applications of respective other current participants in the video party;
the main media video display area in which the current video clip in the media queue is displayed; and
a search element displayed on the display, wherein when the user inputs in the search element a search corresponding to the video party, a new media item is selected from a corresponding media search result provided by a search engine, and the new media item is added to the media queue of the given media party, the search engine allowing sharing of searches among users of the search engine, wherein the search engine shares the search inputted by the user with other users of the search engine; and
graphic indicators, displayed on the display, representing other current participants in the video party.

7. A computing device according to claim 6, wherein the other current participants are operating respective instances of the user interface.

8. A computing device according to claim 6, where the user interface was interacted with by the participant to instantiate the video party, and the other current participants then joined the video party via a social search engine.

9. A computing device according to claim 6, the user interface comprising a chat area that allows the participant to chat with the other current participants.

10. A computing device according to claim 9, wherein when the participant joins another video party, the user interface updates to display indicia of the other video party and the graphic queue comprises icons of video clips in a queue of the other video party.

11. A computing device according to claim 6, wherein the main video display area displays video that lags video displayed for other participants of the video party, and a network service providing the video alters a rate of the video to cause the participant to catch up and begin displaying the same part of a video being displayed for the other participants of the video party.

12. A computing device according to claim 6, further comprising an invite user interface element that can be activated by the participant to invite to the video party other users of a network service managing the video party.

13. A computing device according to claim 6, further comprising a user interface element for scrubbing the currently playing media item, wherein when another participant scrubs the currently playing media item the user interface element displays an avatar of the other participant.

14. A computing device according to claim 6, wherein when any of the current other participants inputs an annotation via a corresponding one of the client applications, in response, the annotation is displayed in the main video display area of corresponding other client applications participating in a same media party.

15. One or more computer-readable storage media, not comprising a signal, and storing information to enable one or more computers to perform a process of operating a media party service, the process comprising:
managing a set of media parties, and managing a set of users of the media party service, the managing the set of media parties including instantiating new media parties according to input from the users, allowing the users to join the media parties, and tracking which users are participating in which media parties;

managing a given one of the media parties by: maintaining a queue of media items comprised of ordered identifiers of media items, wherein the media party service stores a log of events of the given media party, the events corresponding to at least adding media items to the queue, removing media items from the queue, playing of media items;

synchronously streaming the given one of the media parties to client devices of users currently participating in the given media party such that all of the client devices are caused to display a substantially same part of a media item in the corresponding queue; and integrating a search engine with the media party service, the search engine accessible to the users in the set of users, wherein search results of the search engine are able to be interactively selected to be added to the media parties, wherein the search results correspond to searches inputted by the users, and wherein the searches are shared with other users by the search engine and wherein information about the media parties, and wherein the search results correspond to searches inputted by the users, and wherein the searches are shared with other users by the search engine.

16. One or more computer-readable storage media according to claim 15, wherein a given media item is reordered or removed from a given queue by storing a count of user votes directed to the given media item and reordering the given media item in the given queue when the count exceeds a threshold.

17. One or more computer-readable storage media according to claim 15, further comprising receiving a query from a given user in the given media party, receiving search results comprised of a list of media items that match the query, passing the list to a client device of the given user, and adding to the queue of the given party a media item selected from the list at the client device.

18. One or more computer-readable storage media according to claim 15, wherein the media party service provides open access to the video parties such that any user can join any media party and any user in a media party can direct input to a corresponding queue to modify the membership or order of media items in the queue.

19. One or more computer-readable storage media according to claim 15, the process further comprising maintaining histories of the respective media parties and allowing users to play a history of a media party.

* * * * *